United States Patent
Iwata et al.

(10) Patent No.: US 10,465,016 B2
(45) Date of Patent: Nov. 5, 2019

(54) MODIFIED RUBBER FOR TIRE, RUBBER COMPOSITION FOR TIRE USING THE SAME, AND TIRE

(71) Applicant: Mitsubishi Gas Chemical Company, Inc., Tokyo (JP)

(72) Inventors: Tomoki Iwata, Tokyo (JP); Haruka Sakai, Tokyo (JP); Kazuyoshi Uera, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 93 days.

(21) Appl. No.: 15/317,591

(22) PCT Filed: Jun. 10, 2015

(86) PCT No.: PCT/JP2015/066728
§ 371 (c)(1),
(2) Date: Dec. 9, 2016

(87) PCT Pub. No.: WO2015/190519
PCT Pub. Date: Dec. 17, 2015

(65) Prior Publication Data
US 2017/0121429 A1    May 4, 2017

(30) Foreign Application Priority Data

Jun. 10, 2014 (JP) .................................. 2014-119357
Feb. 13, 2015 (JP) .................................. 2015-026281

(51) Int. Cl.
| | | |
|---|---|---|
| C08C 19/22 | (2006.01) | |
| B60C 1/00 | (2006.01) | |
| C08K 3/36 | (2006.01) | |
| C08K 5/5419 | (2006.01) | |
| C08L 15/00 | (2006.01) | |
| C08K 3/04 | (2006.01) | |

(52) U.S. Cl.
CPC ............... C08C 19/22 (2013.01); B60C 1/00 (2013.01); C08K 3/04 (2013.01); C08K 3/36 (2013.01); C08K 5/5419 (2013.01); C08L 15/00 (2013.01)

(58) Field of Classification Search
CPC .. C08C 19/22; C08K 3/04; C08K 3/36; C08L 15/00; B60C 1/00
See application file for complete search history.

(56) References Cited

U.S. PATENT DOCUMENTS

| | | | | |
|---|---|---|---|---|
| 6,380,288 | B1* | 4/2002 | Hojo ..................... | B60C 1/00 |
| | | | | 152/450 |
| 6,515,055 | B1* | 2/2003 | Nohara .................. | C08K 5/29 |
| | | | | 524/186 |
| 10,173,973 | B2* | 1/2019 | Iwata ..................... | B60C 1/00 |
| 2001/0044388 | A1 | 11/2001 | Sivik et al. | |
| 2003/0134947 | A1 | 7/2003 | Nohara et al. | |
| 2010/0249336 | A1 | 9/2010 | Yonemoto | |
| 2011/0237723 | A1 | 9/2011 | Yano et al. | |
| 2013/0331480 | A1 | 12/2013 | Suzuki et al. | |
| 2017/0260302 | A1* | 9/2017 | Iwata ..................... | B60C 1/00 |
| 2018/0194929 | A1* | 7/2018 | Chino .................... | C08K 5/31 |
| 2018/0355074 | A1* | 12/2018 | Kageyama ............. | C08L 7/00 |

FOREIGN PATENT DOCUMENTS

| | | | |
|---|---|---|---|
| CN | 105849132 | A | 8/2016 |
| EP | 0921136 | A1 | 6/1999 |
| EP | 0922713 | A2 | 6/1999 |
| JP | S63-218752 | A | 9/1988 |
| JP | H01-139649 | A | 6/1989 |
| JP | H04-046966 | A | 2/1992 |
| JP | H11-236585 | A | 8/1999 |
| JP | 2001-139728 | A | 5/2001 |
| JP | 2009-108204 | A | 5/2009 |
| JP | 2009-215440 | A | 9/2009 |
| JP | 2010-209253 | A | 9/2010 |
| JP | 2010248334 | A * | 11/2010 |
| JP | 2011-038009 | A | 2/2011 |
| JP | 2011-246513 | A | 12/2011 |
| JP | 2015-117323 | A | 6/2015 |
| WO | 98/44040 | A1 | 10/1998 |
| WO | 2015/093391 | A1 | 6/2015 |
| WO | 2015-093391 | A1 | 6/2015 |

OTHER PUBLICATIONS

International Search Report dated Sep. 15, 2015 for PCT/JP2015/066728 and English translation of the same (5 pages).

* cited by examiner

*Primary Examiner* — Peter D. Mulcahy
(74) *Attorney, Agent, or Firm* — Fitch, Even, Tabin & Flannery LLP

(57) ABSTRACT

Provided is a modified rubber for a tire (A) obtained by modifying a natural rubber and/or a synthetic rubber with a compound represented by formula (1):

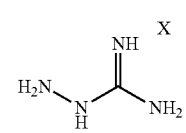

(1)

wherein X is an acid to form a salt with a guanidine site.

9 Claims, No Drawings

MODIFIED RUBBER FOR TIRE, RUBBER COMPOSITION FOR TIRE USING THE SAME, AND TIRE

CROSS-REFERENCE TO RELATED APPLICATIONS

This application is a U.S. national phase application filed under 35 U.S.C. § 371 of International Application PCT/JP2015/066728, filed on Jun. 10, 2015, designating the United States, which claims priority from Japanese Application Nos. 2014-119357 and 2015-026281, filed Jun. 10, 2014 and Feb. 13, 2015, respectively, which are hereby incorporated herein by reference in their entirety.

TECHNICAL FIELD

The present invention relates to a modified rubber for a tire, a rubber composition for a tire using the same, and a tire.

BACKGROUND ART

Fillers are compounding agents to be mixed in a rubber for the purpose of reinforcement or bulking of the rubber, imparting a special function to the rubber, etc. Carbon black, a representative filler, not only contributes to enhancement of the physical properties (reinforcing effect), such as elastic modulus and breaking strength, of a rubber, but also has a function of imparting conductivity, etc.

To obtain a reinforcing effect for rubbers similar to carbon black and obtain a rubber composition having low exothermicity, i.e., low loss characteristics, a method of using an inorganic filler such as silica is known, and has been applied, for example, to rubber compositions for environmentally friendly, fuel-efficient tires, etc.

In an inorganic filler-blended rubber composition, an inorganic filler, especially hydrophilic silica having a silanol group on the surface, blended therein agglomerates in the rubber composition due to its low affinity for a rubber, which is hydrophobic. Thus, it is required to enhance the affinity of silica for a rubber to enhance the reinforcing capability of silica and obtain an effect of low exothermicity. Known examples of such methods include use of a synthetic rubber the affinity of which for inorganic fillers is enhanced through end group modification with a polar group (see Patent Literature 1) and use of a synthetic rubber the affinity of which for inorganic fillers is enhanced through copolymerization of a polar group-containing monomer (see Patent Literature 2). Known examples of methods for modifying a natural rubber to introduce a polar group include a method in which a natural rubber is oxidized and then modified with a hydrazide compound having a polar group (see Patent Literature 3) and a method in which a silane coupling agent is added to a rubber composition containing a modified natural rubber having a polar group introduced and silica to further enhance the dispersibility of the silica (see Patent Literature 4).

CITATION LIST

Patent Literature

Patent Literature 1:
  Japanese Patent Laid-Open No. 2010-209253
Patent Literature 2:
  Japanese Patent Laid-Open No. 2011-038009
Patent Literature 3:
  Japanese Patent Laid-Open No. 2009-108204
Patent Literature 4:
  Japanese Patent Laid-Open No. 2011-246513

SUMMARY OF INVENTION

However, public interest in environmental issues such as the carbon dioxide concentration in the air and the air pollution is expected to increase more and more in the future, and a technique is required to provide a modified rubber, a rubber composition containing the modified rubber and an inorganic filler such as silica and being excellent in low loss characteristics, and a tire each of which reduces the rolling resistance of a tire to provide fuel-efficient automobiles. Currently, such requirements have not been met sufficiently.

The present invention was made in view of the above circumstances, and an object of the present invention is to provide a modified rubber capable of enhancing low loss characteristics and breaking strength when being added to a rubber composition.

As a result of diligent research, the present inventors found that a modified rubber obtained by modifying a natural rubber and/or a synthetic rubber with a compound having a specific structure can solve the above problem, and thus completed the present invention.

The present invention is as follows.
[1] A modified rubber for a tire (A) obtained by modifying a natural rubber and/or a synthetic rubber with a compound represented by formula (1):

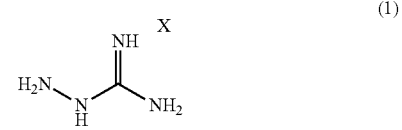

wherein X is an acid to form a salt with a guanidine site.
[2] The modified rubber for the tire (A) according to [1], wherein the natural rubber and/or the synthetic rubber is mixed with the compound represented by the formula (1) and modified in the range of 20 to 180° C.
[3]
  The modified rubber for the tire (A) according to [1] or [2], wherein the compound represented by the formula (1) is used at 0.01 to 10% by mass, based on an amount of the natural rubber and/or the synthetic rubber.
[4]
  A rubber composition for a tire comprising: the modified rubber (A) according to any one of [1] to [3]; a filler containing an inorganic filler (B); and a silane coupling agent (C).
[5]
  The rubber composition for the tire according to [4], wherein the inorganic filler (B) is silica.
[6]
  The rubber composition for the tire according to [4] or [5], wherein the filler comprises carbon black.
[7]
  The rubber composition for the tire according to any one of [4] to [6] comprising the modified rubber (A), wherein the rubber composition is obtained by mixing the compound represented by the formula (1), the natural rubber and/or the synthetic rubber, the filler containing an inorganic filler (B), and the silane coupling agent (C) together.

[8]

The rubber composition for the tire according to [7], wherein a temperature in mixing is in a range of 20 to 180° C.

[9]

The rubber composition for the tire according to [7] or [8], wherein a content of the compound represented by the formula (1) is 0.01 to 10% by mass, based on an amount of the natural rubber and/or the synthetic rubber.

[10]

A tire using the rubber composition according to any one of [4] to [9] for a tread of a tire member.

The modified rubber according to the present invention enables providing a rubber composition and a tire which are excellent in low loss characteristics and breaking strength.

DESCRIPTION OF EMBODIMENTS

Hereinafter, modes for carrying out the present invention (hereinafter, simply referred to as "one embodiment(s) of the present invention" or "the present embodiment(s)") will be described in detail. The embodiments of the present invention in the following are examples for describing the present invention, and it is not intended to limit the present invention to the following description. Appropriate modifications may be made in the practice of the present invention within the gist of the present invention.

A modified rubber for a tire (A) according to one embodiment of the present invention (hereinafter, occasionally referred to as "modified rubber" simply) can be obtained by modifying a natural rubber and/or a synthetic rubber with the compound represented by the following formula (1):

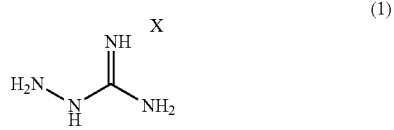

(1)

wherein X is an acid to form a salt with a guanidine site.

For a raw material rubber of the modified rubber (A) according to the present embodiment, a natural rubber, a synthetic rubber, or both of them may be used. Among them, a natural rubber is suitable because use of it provides the advantageous effect of the present embodiment significantly. The reason is that, in contrast to synthetic rubbers, into which a polar group can be introduced in polymerization in a simple manner, for example, as in the case of a synthetic rubber whose affinity for inorganic fillers has been enhanced through end modification with a polar group described in Patent Literature 1, a synthetic rubber whose affinity for inorganic fillers has been enhanced through copolymerization of a polar group-containing monomer described in Patent Literature 2, etc., natural rubbers cannot be applied with such approaches.

For the natural rubber, a sheet rubber or a block rubber each obtained by coagulating and drying a natural rubber latex may be used as a raw material. Examples of sheet rubbers include, in accordance with the classification of "International Standards of Quality and Packing for Natural Rubber Grades" (commonly called "Green Book"), ribbed smoked sheets (RSS), which are obtained by smoking a sheet to dry, air-dried sheets (ADS), which are obtained by drying a sheet with hot air, and crepes, which are obtained by sufficiently washing a coagulate with water followed by drying with hot air, and further include TC rubbers (Technically Classified Rubber), SP rubbers (Super Processing Rubber), MG rubbers, PP crepes, softeners, and peptizer-containing rubbers. Examples of block rubbers include SMR (Standard Malaysian Rubber) from Malaysia, SIR from Indonesia, TTR from Thailand, SCR from Sri Lanka, and SSR from Singapore. One of these natural rubber raw materials may be used singly, or two or more thereof may be used in combination.

Alternatively, a rubber obtained by coagulating a natural rubber latex after oxidation treatment may be used, and oxidation of a natural rubber latex can be performed by using a known method. For example, oxidation of a natural rubber latex can be performed by air-oxidizing a natural rubber latex dissolved in an organic solvent at a fraction of 1 to 30% by mass in the presence of a metal oxidation catalyst in accordance with Japanese Patent Laid-Open No. 8-81505. As described in Japanese Patent Laid-Open No. 9-136903, oxidation can be performed by adding a carbonyl compound to a natural rubber latex. In the case that air oxidation is performed as an oxidizing method, air oxidation may be performed in the presence of a radical generator to promote air oxidation as described in Japanese Patent Laid-Open No. 9-136903. For example, a peroxide radical generator, a redox-type radical generator, an azo radical generator, or the like is suitably used for the radical generator.

Examples of synthetic rubbers which can be used for a raw material of the modified rubber (A) include 1,4-polybutadiene, 1,2-polybutadiene, 1,4-polyisoprene, 3,4-polyisoprene, styrene-butadiene rubbers, end-modified styrene-butadiene rubbers, chloroprene rubbers, nitrile rubbers, ethylene-propylene rubbers, ethylene-propylene-diene rubbers, and diene rubbers having a double bond in the molecule.

In the present embodiment, the above-described natural rubber, modified rubber, or both of them may be used. In other words, one of them may be used singly, or two or more thereof may be used in combination.

A rubber modifier in the present embodiment is an aminoguanidine salt represented by formula (1):

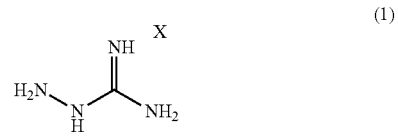

(1)

wherein X is an acid to form a salt with a guanidine site.

A modified rubber obtained by reacting the modifier with a rubber has a polar group such as an amino group, and thus affinity for a polar group of an inorganic filler, particularly in the case of silica, affinity for a silanol group on the surface of silica is enhanced, for example. As a result, the adhesion between the rubber and the inorganic filler is enhanced, and a molded rubber product having better low loss characteristics can be provided in manufacturing a molded rubber product such as a tire; however, the effect of the present embodiment is not limited thereto.

X in the formula (1) can be an acid capable of forming a salt with a guanidine site, and the type of the acid is not limited. Examples thereof include organic acids (acetic acid, oxalic acid, p-toluenesulfonic acid, etc.) and inorganic acids (hydrochloric acid, hydrobromic acid, hydroiodic acid, nitric acid, sulfuric acid, phosphoric acid, carbonic acid, sulfamic acid, perchloric acid, silicic acid, boric acid, phenylphosphinic acid, etc.). For a modifier containing a hydrazine site in the molecule and having a polar group such as an amino group, use of semicarbazide hydrochloride, thiosemicarbazide, or the like is contemplated, in addition to an aminoguanidine salt. However, semicarbazide hydrochloride corresponds to Category 3 in GHS classification for acute toxicity (oral) and is positive to specific bacterium strains (TA1535 and TA100) in an Ames test (Evaluation Report on Drugs for Animals, 2007), and thiosemicarbazide corresponds to Category 2 in GHS classification for acute toxicity (oral) and is designated as a poisonous substance in Poisonous and Deleterious Substances Control Act. Thus, they are highly poisonous and impracticable in light of handleability.

On the other hand, aminoguanidine is a raw material for synthesis of medicines, dyes, photographic chemicals, gunpowder, etc., and in particular, its anti-glycation effect is widely known in the field of medicines. As the anti-glycation effect of aminoguanidine have been found inhibition of the in vitro formation of AGEs, inhibition of the crosslinking or polymerization of a protein, and prophylaxis of nephropathy, retinopathy, and neuropathy and an effect of preventing the progression of diabetes complications in an animal model of diabetes. Aminoguanidine carbonate is out of categories in GHS classification for acute toxicity (oral) and is negative in an Ames test, and thus is considered as a less poisonous compound.

Aminoguanidine is highly basic because the positive charge of the conjugate acid is dispersion-stabilized by a plurality of nitrogen atoms present in the molecule, and thus is present as a complex (salt) with an acid in common cases. Examples of aminoguanidine salts include aminoguanidine carbonate (melting point: 162° C. (decomposition)), aminoguanidine hydrochloride (melting point: 165° C.), aminoguanidine hydroiodide (melting point: 115 to 118° C.), aminoguanidine hydrobromide, aminoguanidine hemisulfate (melting point: 207° C.) aminoguanidine nitrate (melting point: 145 to 147° C.), aminoguanidine oxalate (melting point: 209° C.) aminoguanidine phosphate (melting point: 144° C.), aminoguanidine acetate, aminoguanidine sulfamate, aminoguanidine perchlorate, aminoguanidine silicate, aminoguanidine borate, and aminoguanidine phenylphosphinate.

Next, a method for manufacturing the modified rubber according to the present embodiment will be described. The modified rubber according to the present embodiment is obtained, for example, by mixing a modifier as the compound represented by formula (1) and a rubber by using a mixer, an extruder, a kneader, or the like. It is preferred to mix by using a kneader from the viewpoint of enhancement of dispersibility. For adding the modifier into a mixer, an extruder, a kneader, or the like, any of a method of adding a powder of the compound directly, a method of adding a solution of the compound dissolved in a solvent, and a method of adding the compound in an emulsion solution may be used.

Although reaction conditions for obtaining the modified rubber according to the present embodiment are not limited, the reaction temperature for a rubber and the modifier is preferably 20 to 180° C., and more preferably 50 to 160° C. Controlling the reaction temperature in such a temperature range enables sufficient mixing of a rubber and the modifier and further the decomposition of the modifier can be prevented. The kneading duration for a rubber is preferably controlled to 0.5 to 30 minutes at the above reaction temperature, and is more preferably 2 to 10 minutes. A kneading duration of 0.5 to 30 minutes allows a rubber and the modifier to react sufficiently without deterioration of productivity. Regarding to the reaction atmosphere, it is preferred to perform the reaction in the presence of oxygen, for example, in air. The reason is that a part of a rubber is oxidized through kneading in the presence of oxygen and the reactivity to the modifier is enhanced.

Although the modified rubber according to the present embodiment can be obtained by mixing the modifier and a rubber at once by using an extruder, a kneader, or the like, an approach in which a rubber obtained by coagulating a natural rubber latex after oxidation treatment is used, and an approach in which a step of applying mechanical force to a raw material rubber, which is called mastication, is carried out before addition of the modifier to dissociate agglomerations (associations) of molecules and cleave the molecular chain for controlling the plasticity of the rubber to a plasticity which allows for easy processing are also preferably employed because the reactivity between the modifier and a rubber can be enhanced. In the step of mastication, a peptizer may be used.

If the modifier, a rubber, a filler containing an inorganic filler, a silane coupling agent, and compounding agents appropriately selected as necessary are blended and mixed together by using a mixer, an extruder, a kneader, or the like, a modified rubber is partly formed in the rubber composition. This approach is more preferred than the approach in which the modifier and a rubber are mixed together from the viewpoint of working efficiency. This operation provides a rubber composition according to one embodiment of the present invention.

The amount of the modifier as the compound represented by formula (1) to be used in manufacturing the modified rubber according to the present embodiment is preferably 0.01 to 10% by mass, and more preferably 0.1 to 3% by mass, based on the amount of the rubber component (natural rubber and/or synthetic rubber) because a small number of polar groups evenly introduced into each rubber molecule enhance the affinity of the modified rubber obtained for a filler such as silica and carbon black without lowering processability, and thus a rubber composition having excellent low loss characteristics is provided. In the case that a natural rubber and a synthetic rubber are used in combination, the amount of the compound here refers to the amount based on the total amount of the natural rubber and the synthetic rubber.

A rubber composition for a tire according to one embodiment of the present invention (hereinafter, occasionally referred to as "rubber composition" simply) preferably contains the modified rubber (A), a filler containing an inorganic filler (B), and a silane coupling agent (C).

The inorganic filler (B) in the present embodiment refers to an inorganic compound containing at least one selected from silicon, oxides or hydroxides of typical metals or transition metals and hydrates thereof, and carbonates of these metals.

Specifically, the inorganic filler (B) is not limited as long as it is an inorganic filler used in the art. Carbon black to be described later is not included in the inorganic filler (B) here, and does not fall under the inorganic filler (B). Inorganic fillers are roughly classified into reinforcing fillers such as silica having an active surface and surface-treated clay and non-reinforcing fillers such as calcium carbonate, clay, and talc. Specific examples of the inorganic filler (B) include silica, calcium carbonate, magnesium carbonate, aluminum oxide, aluminum hydroxide, aluminum silicate (clay), magnesium silicate (talc), calcium silicate, and zinc oxide. In view of interaction with the modified rubber, it is preferred to use any of the reinforcing fillers, and silica is more preferred among them. The silica is not limited, and wet silica (hydrated silicic acid), dry silica (silicic anhydride), or the like may be used.

In the case that silica is used, the BET specific surface area is preferably 40 to 350 m$^2$/g. If the BET specific surface area of silica is within the range, the particle diameter of the silica becomes appropriate, which leads to enhancement of the tensile strength and reduction of hysteresis loss. The BET specific surface area can be measured in accordance with JIS 28830: 2013.

In addition to the above inorganic filler (B), carbon black may be added as a filler to be used for the rubber composition according to the present embodiment to enhance the reinforcing effect. Here, carbon black is a filler different from the above inorganic filler (B), and should be clearly discriminated from the inorganic filler (B). Examples of carbon black include those of various grades GPF, FEF, SRF, HAF, ISAF, and SAF.

The total content of the inorganic filler (B) and carbon black in the rubber composition according to the present embodiment is not limited, but preferably 5 to 100 parts by mass, and more preferably 20 to 80 parts by mass, based on 100 parts by mass of other organic components of the rubber composition such as the modified rubber (A) to obtain a sufficient loss-reduction effect and reinforcing effect without deterioration of processability.

The silane coupling agent (C) in the present embodiment is not limited, and examples thereof include bis-(3-triethoxysilylpropyl) tetrasulfide, bis-(3-trimethoxysilylpropyl) tetrasulfide, bis-(3-methyldimethoxysilylpropyl) tetrasulfide, bis-(2-triethoxysilylethyl) tetrasulfide, bis-(3-triethoxysilylpropyl) disulfide, bis-(3-trimethoxysilylpropyl) disulfide, bis-(3-triethoxysilylpropyl) trisulfide, 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, 2-lauroylthioethyltrimethoxysilane, 3-mercaptopropyltrimethoxysilane, 3-mercaptopropyltriethoxysilane, 3-mercaptopropylmethyldimethoxysilane, 3-aminopropyltrimethoxysilane, 3-aminopropyltriethoxysilane, γ-glycidoxypropyltrimethoxysilane, γ-glycidoxypropylmethyldiethoxysilane, 3-trimethoxysilylpropyl-N,N-dimethylthiocarbamoyl tetrasulfide, 3-trimethoxysilylpropylbenzothiazolyl tetrasulfide, and 3-trimethoxysilylpropylmethacryloyl monosulfide. The content is preferably 1 to 20 parts by mass, based on 100 parts by mass of the inorganic filler.

In addition to the modified rubber, a rubber, the filler containing an inorganic filler, and the silane coupling agent, compounding agents commonly used in the rubber industry, such as an antioxidant, a softener, a vulcanization accelerator, a vulcanization-accelerating aid, and vulcanizing agent, may be appropriately selected and blended in the rubber composition according to the present embodiment, without interfering with the object of the present embodiment. For these compounding agents, commercial products can be suitably used.

The type of the antioxidant is not limited, and examples thereof include naphthylamine antioxidants, p-phenylenediamine antioxidants, hydroquinone derivative antioxidants, bis-, tris-, and polyphenol antioxidants, diphenylamine antioxidants, quinoline antioxidants, monophenol antioxidants, thiobisphenol antioxidants, hindered phenol antioxidants. From the viewpoint of a higher antioxidizing effect, amine antioxidants such as p-phenylenediamine antioxidants and diphenyl amine antioxidants are preferred. Examples of diphenyl amine antioxidants include 4,4'-(α-methylbenzyl)diphenylamine, 4,4'-(α,α-dimethylbenzyl)diphenylamine, p-(p-toluene-sulfonylamido)diphenylamine, and 4,4'-dioctyldiphenylamine. Among them, 4,4'-(α-methylbenzyl)diphenylamine is the most preferred from the viewpoint of an even higher antioxidizing effect. Examples of p-phenylenediamine antioxidants include N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1,4-dimethylpentyl)-p-phenylenediamine, N,N'-bis(1-ethyl-3-methylpentyl)-p-phenylenediamine, and N-(1,3-dimethylbutyl)-N'-phenyl-p-phenylenediamine. Among them, N-(1,3-dimethylbutyl)-N'-phenyl-p-phenylenediamine is the most preferred from the viewpoint of an even higher antioxidizing effect and cost. The content of the antioxidant in the rubber composition is preferably 0.1 to 5% by mass, based on the amount of the rubber component of the rubber composition.

The type of the softener is not limited, and examples thereof include mineral oil softeners derived from petroleum and coal tar, vegetable oil softeners derived from fatty oils and pine trees, and synthetic resin softeners.

The type of the vulcanization accelerator is not limited, and examples thereof include thiazole vulcanization accelerators such as mercaptobenzothiazole and di-2-benzothiazolyl disulfide; sulfenamide vulcanization accelerators such as N-cyclohexyl-2-benzothiazolylsulfenamide, N,N'-dicyclohexyl-2-benzothiazolylsulfenamide, and N'-tert-butyl-2-benzothiazolylsulfenamide; and guanidine vulcanization accelerators such as diphenylguanidine. One of these vulcanization accelerators may be used singly, or two or more thereof may be used in combination. The content is preferably 0.1 to 5 parts by mass, based on 100 parts by mass of the rubber component. The vulcanization-accelerating aid is not limited, and examples thereof include stearic acid and zinc oxide.

Regarding the type of the vulcanizing agent, vulcanizing agents commonly used in the art may be appropriately used, and examples thereof include sulfur and peroxides. Among them, sulfur is preferred. The content of the vulcanizing agent is preferably 0.1 to 5 parts by mass, and more preferably 0.5 to 3 parts by mass, based on 100 parts by mass of the rubber component. If the lower limit of the content of the vulcanizing agent is the above value or more, sufficient vulcanization can be achieved. If the upper limit of the content of the vulcanizing agent is the above value or less, what is called scorch time is not too shortened and failure such as burning of a rubber during kneading can be effectively prevented.

A tire according to one embodiment of the present invention includes the above rubber composition, and in particular it is preferred to use the rubber composition for the tread. A tire using the rubber composition for the tread is excellent in fuel efficiency. The tire according to the present embodiment is not limited except that the rubber composition is used for any of the members of the tire, and can be manufactured by using a conventional method. Examples of gas to be used for filling the tire include, in addition to normal air and air having an adjusted oxygen partial pressure, inert gasses such as nitrogen, argon, and helium.

EXAMPLES

Hereinafter, the present invention will be described in more detail with reference to Examples and Comparative Examples, but the present invention is never limited to the following Examples.

(Synthesis Example 1) Synthesis of Aminoguanidine Phosphate (2)

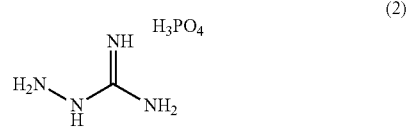

(2)

To a 50 mL eggplant flask, 4.03 g (30 mmol) of aminoguanidine carbonate (manufactured by Tokyo Chemical Industry Co., Ltd.) was added and 4 g of water was added thereto, and the resultant was then stirred with a magnetic stirrer. Subsequently, 3.43 g (30 mmol) of 85% phosphoric acid was added dropwise thereto. Thereafter, the reaction solution was added dropwise to 150 mL of methanol. Immediately, a white solid precipitated. The white solid precipitated was collected by filtration, washed with methanol, and then vacuum-dried at 50° C. for 18 hours to afford 3.74 g (22 mmol) of a white solid. Elemental analysis was performed for the solid obtained with the carbon/hydrogen/nitrogen simultaneous determination apparatus CHN coder MT-6 (manufactured by YANACO Co., Ltd.), and the result was as follows. Calc.: C, 6.98; H, 5.27; N, 32.56. Found: C, 6.82; H, 5.25; N, 32.13. Thus, it was confirmed to be aminoguanidine phosphate. The mole yield was 73%. The melting point was measured with the micro melting point measurement apparatus BY-1 (manufactured by YAZAWA Kagaku Co., Ltd.) to be 143 to 144° C.

(Synthesis Example 2) Synthesis of Aminoguanidine Oxalate (3)

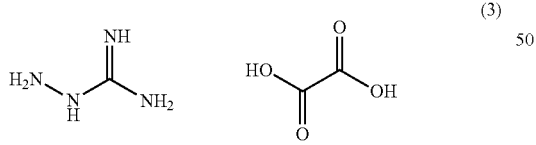

(3)

To a 50 mL eggplant flask, 3.98 g (29 mmol) of aminoguanidine carbonate (manufactured by Tokyo Chemical Industry Co., Ltd.) was added and 18 g of water was added thereto, and the resultant was then stirred with a magnetic stirrer. Subsequently, 2.63 g (29 mmol) of oxalic acid was added thereto in small portions, and the resultant was stirred until bubble formation ceased. A white solid precipitated was collected by filtration, washed with methanol, and then vacuum-dried at 50° C. for 18 hours to afford 3.39 g (21 mmol) of a white solid. Elemental analysis was performed for the solid obtained with the carbon/hydrogen/nitrogen simultaneous determination apparatus CHN coder MT-6 (manufactured by YANACO Co., Ltd.), and the result was as follows. Calc.: C, 21.96; H, 4.91; N, 34.14. Found: C, 21.78; H, 4.75; N, 34.22. Thus, it was confirmed to be aminoguanidine oxalate. The mole yield was 71%. The melting point was measured with the micro melting point measurement apparatus BY-1 (manufactured by YAZAWA Kagaku Co., Ltd.) to be 211 to 212° C.

Example 1

In a Labo Plastmill (manufactured by Toyo Seiki Seisakusho, Ltd.) with the inside of the mixer heated to 30° C., 41.4 g of a natural rubber coagulate (RSS #1, manufactured by Kato Sansho Co., Ltd.) was placed and kneaded at a rotational frequency of 60 rpm, for 4 minutes with the lid closed and for 1 minute with the lid opened. When the temperature of the rubber increased to reach 80° C. due to shear heating, 0.828 g of aminoguanidine hydrochloride (manufactured by Tokyo Chemical Industry Co., Ltd.) was placed therein, and the resultant was further kneaded for 3 minutes to obtain a modified rubber 1. Then, the temperature of the rubber had reached 85° C.

In 200 g of a 2:1 mixed solvent of acetone and methanol, 9.0 g of the modified rubber 1 was heated to reflux for 2 hours to extract unreacted aminoguanidine hydrochloride. After the solvent was distilled away under reduced pressure, the residue was subjected to quantitative analysis by using liquid chromatography, and the result showed that 0.030 g of 1-methylethylideneaminoguanidine hydrochloride, a condensation product of aminoguanidine hydrochloride and acetone, was contained. In other words, the amount of unreacted aminoguanidine hydrochloride extracted was 0.022 g and 87% of aminoguanidine hydrochloride added reacted with the natural rubber. Thus, it was found that the amount of addition of aminoguanidine in the modified rubber 1 was 1.7% by mass, based on the amount of the solid rubber component of the natural rubber raw material.

Reference Example 1

In a Labo Plastmill with the inside of the reactor heated to 30° C., 41.4 g of a natural rubber coagulate (RSS #1) was placed and kneaded at a rotational frequency of 60 rpm, for 4 minutes with the lid closed and for 1 minute with the lid opened. After the temperature of the rubber reached 80° C. due to shear heating, the rubber was further kneaded for 3 minutes to obtain an unmodified rubber 1. Then, the temperature of the rubber had reached 85° C.

Examples 2, Comparative Example 1

In accordance with a composition listed in Table 1, the modified rubber 1, or the unmodified rubber 1 was first kneaded with silica, a silane coupling agent, zinc oxide, and stearic acid with a Labo Plastmill at 140° C. for 5 minutes, and the resultant was then cooled to 55° C. Sulfur and a vulcanization accelerator were placed therein, and the resultant was kneaded at 90° C. for 3 minutes to prepare a rubber composition. Subsequently, the rubber composition was vulcanized with a pressing machine (manufactured by KITAGAWA SEIKI Co., Ltd.) at 145° C. and 10 MPa for 38 to 41 minutes to obtain a vulcanized rubber composition. The components used are shown below.

Examples 3 to 6, Comparative Example 2

In accordance with a composition listed in Table 2, a natural rubber coagulate, silica, a silane coupling agent, zinc oxide, stearic acid, and one of modifiers 1 to 4 were first kneaded together with a Labo Plastmill at 140° C. for 5 minutes, and the resultant was then cooled to 50° C. Sulfur and a vulcanization accelerator were placed therein, and the resultant was kneaded at 90° C. for 3 minutes to prepare a rubber composition. Subsequently, the rubber composition was vulcanized with a pressing machine (manufactured by KITAGAWA SEIKI Co., Ltd.) at 145° C. and 10 MPa for 27 to 39 minutes to obtain a vulcanized rubber composition. The components used are as follows.

Natural rubber: RSS #1
Silica: product name "Nipsil AQ" (BET specific surface area=207 $m^2/g$, manufactured by Tosoh Silica Corporation)
Silane coupling agent: bis(3-triethoxysilylpropyl) tetrasulfide (manufactured by Evonic Japan Co., Ltd.) Zinc oxide (manufactured by Wako Pure Chemical Industries, Ltd.)
Stearic acid (manufactured by Wako Pure Chemical Industries, Ltd.)
Sulfur (manufactured by Hosoi Chemical Industry Co., Ltd., 250 μm)
Vulcanization accelerator (CBS): N-cyclohexyl-2-benzothiazolylsulfenamide (manufactured by Wako Pure Chemical Industries, Ltd.)
Vulcanization accelerator (DPG): diphenylguanidine (manufactured by Wako Pure Chemical Industries, Ltd.)
Modifier 1: aminoguanidine hydrochloride (manufactured by Tokyo Chemical Industry Co., Ltd.)
Modifier 2: aminoguanidine carbonate (manufactured by Tokyo Chemical Industry Co., Ltd.)
Modifier 3: aminoguanidine phosphate obtained in Synthesis Example 1
Modifier 4: aminoguanidine oxalate obtained in Synthesis Example 2

For the vulcanized rubber composition, exothermicity and tensile breaking strength were measured and evaluated by using the following methods. The results are shown in Tables 1 and 2.

(1) Exothermicity

The loss tangent (tan δ) of the vulcanized rubber composition was measured with a dynamic viscoelastometer (DMS6100 manufactured by Seiko Instruments Inc.) at a temperature of 50° C., a strain of 0.05%, and a frequency of 10 Hz, and represented by an index number in Table 1 and Table 2, assuming the value for Comparative Example 1 as 100 in Table 1 and assuming the value for Comparative Example 2 as 100 in Table 2. A smaller index number corresponds to lower tan δ, and indicates that the rubber composition has low exothermicity.

(2) Tensile Breaking Strength

The vulcanized rubber composition was subjected to a tensile test to measure the tensile breaking strength in accordance with JIS K6251:2010, and represented by an index number, assuming the value for Comparative Example 1 as 100 in Table 1 and assuming the value for Comparative Example 2 as 100 in Table 2. A larger index number corresponds to a larger tensile breaking strength.

TABLE 1

|  | Example 2 | Comparative Example 1 |
|---|---|---|
| Modified rubber 1 | 100 | — |
| Unmodified rubber 1 | — | 100 |
| Silica | 50 | 50 |
| Silane coupling agent | 5 | 5 |
| Zinc oxide | 3 | 3 |
| Stearic acid | 1 | 1 |
| Sulfur | 1.75 | 1.75 |

TABLE 1-continued

|  | Example 2 | Comparative Example 1 |
|---|---|---|
| Vulcanization accelerator (CBS) | 1 | 1 |
| Vulcanization accelerator (DPG) | 0.5 | 0.5 |
| Exothermicity | 73 | 100 |
| Tensile breaking strength | 111 | 100 |

In Table 1, each component of a formulation is in part by mass.

From Table 1, it was at least found that the rubber composition in Example 2 has better low exothermicity and larger tensile breaking strength than a rubber composition in Comparative Example 1 obtained from a mixture with a diene rubber not modified with an aminoguanidine salt.

TABLE 2

|  | Example 3 | Example 4 | Example 5 | Example 6 | Comparative Example 2 |
|---|---|---|---|---|---|
| Natural rubber | 100 | 100 | 100 | 100 | 100 |
| Silica | 50 | 50 | 50 | 50 | 50 |
| Silane coupling agent | 5 | 5 | 5 | 5 | 5 |
| Zinc oxide | 3 | 3 | 3 | 3 | 3 |
| Stearic acid | 1 | 1 | 1 | 1 | 1 |
| Sulfur | 1.75 | 1.75 | 1.75 | 1.75 | 1.75 |
| Vulcanization accelerator (CBS) | 1 | 1 | 1 | 1 | 1 |
| Vulcanization accelerator (DPG) | 0.5 | 0.5 | 0.5 | 0.5 | 0.5 |
| Modifier 1 | 2.0 | — | — | — | — |
| Modifier 2 | — | 1.0 | — | — | — |
| Modifier 3 | — | — | 1.0 | — | — |
| Modifier 4 | — | — | — | 1.0 | — |
| Exothermicity | 68 | 72 | 75 | 92 | 100 |
| Tensile breaking strength | 107 | 112 | 107 | 103 | 100 |

In Table 2, each component of a formulation is in part by mass.

From Table 2, it was at least found that the rubber composition in each of Examples 3 to 6 has better low exothermicity and larger tensile breaking strength than the rubber composition in Comparative Example 2, which was obtained from a mixture with no aminoguanidine salt added.

The modified rubber for a tire (A), and rubber composition for a tire according to the present invention can be used as a material for various members of a tire including a tread.

The invention claimed is:

1. A rubber composition for a tire comprising:
    modified rubber for a tire (A) obtained by reacting a natural rubber and/or a synthetic rubber with a compound represented by formula (1)

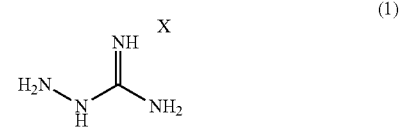

(1)

wherein X is an acid to form a salt with a guanidine site and the acid is selected from oxalic acid and inorganic acids;
a filler containing an inorganic filler (B); and
a silane coupling agent (C).

2. The rubber composition for the tire according to claim 1, wherein the natural rubber and/or the synthetic rubber is mixed with the compound represented by the formula (1) and modified in the range of 20 to 180° C.

3. The rubber composition for the tire according to claim 1, wherein the compound represented by the formula (1) is used at 0.01 to 10% by mass, based on an amount of the natural rubber and/or the synthetic rubber.

4. The rubber composition for the tire according to claim 1, wherein the inorganic filler (B) is silica.

5. The rubber composition for the tire according to claim 1, wherein the filler comprises carbon black.

6. The rubber composition for the tire according to claim 1, wherein the rubber composition is obtained by mixing the compound represented by the formula (1), the natural rubber and/or the synthetic rubber, the filler containing an inorganic filler (B), and the silane coupling agent (C) together.

7. The rubber composition for the tire according to claim 6, wherein a temperature in mixing is in a range of 20 to 180° C.

8. The rubber composition for the tire according to claim 6, wherein a content of the compound represented by the formula (1) is 0.01 to 10% by mass, based on an amount of the natural rubber and/or the synthetic rubber.

9. A tire using the rubber composition according to claim 1 for a tread of a tire member.

\* \* \* \* \*